Dec. 28, 1937.   W. M. ZAROTSCHENZEFF   2,103,925
METHOD OF FREEZING FRUITS
Original Filed April 10, 1934
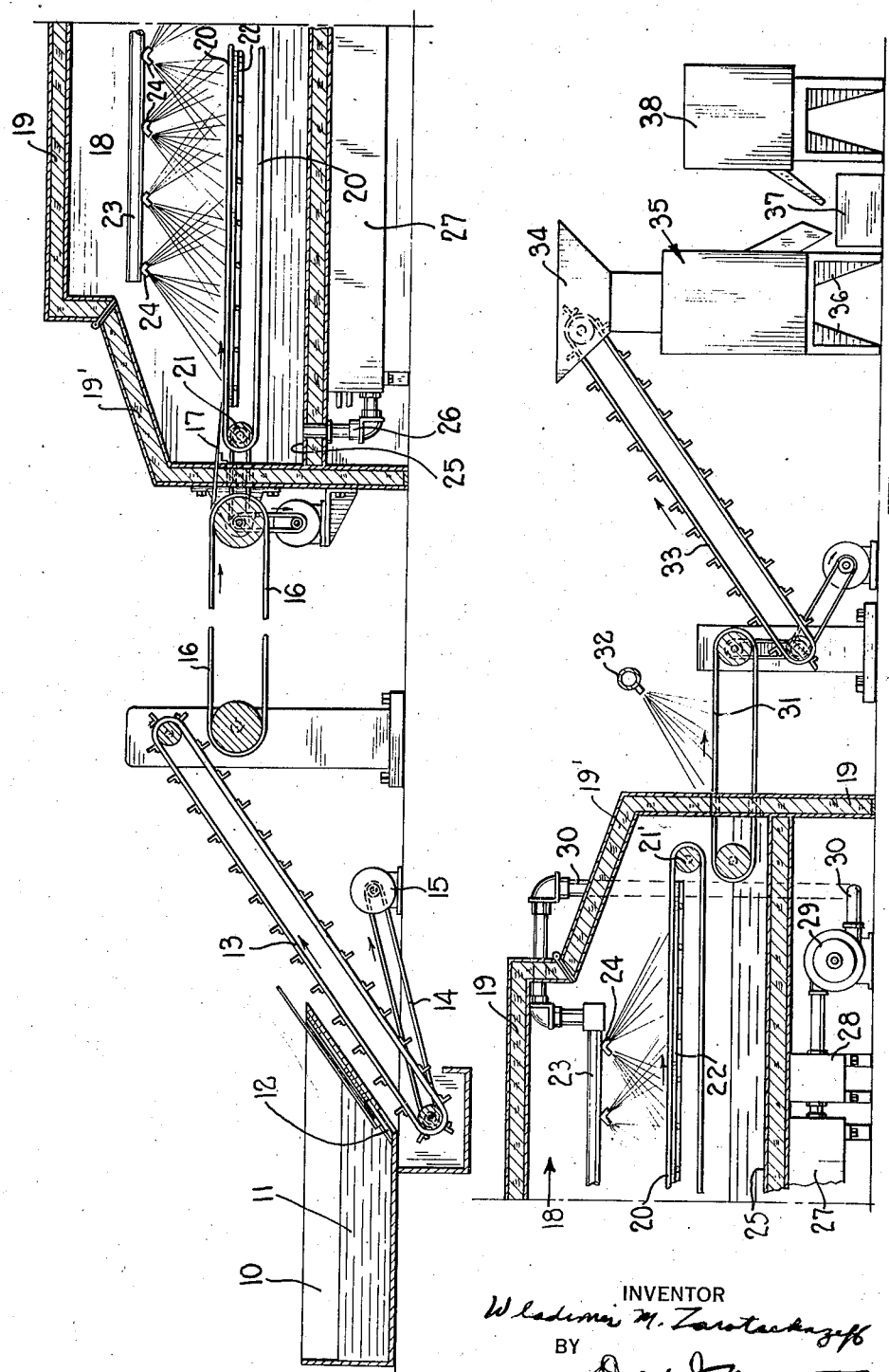

Patented Dec. 28, 1937

2,103,925

UNITED STATES PATENT OFFICE 2,103,925

METHOD OF FREEZING FRUITS

Wladimir M. Zarotschenzeff, Englewood, N. J., assignor to Z Pack Corporation, a corporation of Delaware Application April 10, 1934, Serial No. 719,843
Renewed January 12, 1937

6 Claims. (Cl. 99—193)

This invention relates to improvements in methods of and apparatus for freezing cherries and like fruits.

Up to the present time cherries and like fruits have been frozen for commercial use by a variation of the well-known "cold-pack" method, which essentially comprises a process involving grading and inspecting the fruit, cooling the same in ice water, pitting the fruit, and packing the pitted fruit in barrels or containers with the addition of sugar, sealing the barrels or containers and placing the same in a freezing chamber for refrigeration; the freezer rooms usually are maintained at temperatures from 10° F. down to minus 20° F. and the time of freezing is usually seven days, after which the barreled or packed fruit is transferred to ordinary cold storage at temperatures of from 15° down to 0° F.

The quality of cherries or other fruit packed in this manner and in these containers is not very good for several reasons, first, the weight of the unfrozen fresh pitted fruit and the sugar mixed therewith exert considerable pressure on the lower level of the fruit in the containers or barrels, causing much of the juice of the fruit at such levels to be pressed out; second, the long period of freezing causes the fruit in the center of the barrel or container to sour and deteriorate, due to the heat generated in the fruit; and third, in pitting the fruit before freezing the centers of the fruit are removed, therefore weakening the structure thereof, and causing considerable juice to be discharged therefrom by pressure in the containers during the freezing and storage periods.

In general this invention provides a method and apparatus for freezing cherries or like fruits, which will produce a product having substantially all of the color, substance and formation when ready for use, as a fresh picked product.

Broadly, it is an object of this invention to provide for a method involving quickly freezing within a period of a few minutes cherries or like fruits, and pitting the cherries or like fruit while in frozen state, thereafter sugaring and packing the same, and delivering to cold storage chamber for future use.

Further, it is an object of this invention to provide a novel method of refrigeration for cherries or the like, wherein the same are subjected to direct contact of an atomized refrigerant in the form of a fog or spray as the same are progressively moved through a freezing chamber, the products being frozen in a very short time.

Still further, it is an object of this invention to provide for a method of treating products involving the pitting or removal of the stones therein after quick freezing of the same.

These and other advantages, capabilities and features of the invention will appear from the subjoined detailed description of one specific embodiment thereof illustrated in the accompanying drawing, in which The only figure in this drawing discloses the apparatus for treating cherries or like fruits in accordance with this invention.

Referring to the reference characters in the drawing, numeral 10 represents a washing tank containing ice water 11, which cools the cherries from atmospheric temperature to about a range of 50°–55° F. The cherries are then discharged from the washing tank 10 by means of trap door 12 onto a well-known form of inclined elevator 13, which may be driven by belt 14 from motor 15 or the like. The fruit is then discharged from the elevator 13 onto a belt 16, where the fruit may be inspected, and from which belt the same are delivered by means of an inclined trough or runway 17 on a conveyor in freezing tunnel or chamber 18, the walls 19 of which are insulated, such walls having flap doors 19' at opposite ends for permitting entrance into and delivery from the chamber of cherries.

The conveyor within the tunnel or chamber 18 is in the form of a perforate or wire mesh belt 20 actuated by drums 21 and 21' at opposite ends thereof and supported at the edges by angle bars 22. Above the conveyor are disposed a series of conduits 23 carrying groups of atomizing nozzles 24 having one or more outlets from which atomizing nozzles brine is sprayed in the form of a fog or spray, the fog or spray being adapted to contact with the surfaces of the cherries on the conveyor and the temperature of the spray or fog being at about 0° F., and the passage of a cherry taking from five to ten minutes from one end of the freezing tunnel or chamber to the other, by which time the cherry or fruit is frozen hard.

The atomized brine, in the form of a fog or spray, acts upon the cherries to freeze the same by withdrawing heat therefrom and when such fog, or spray, after extracting heat, condenses, the particles thereof drop into the shallow brine bath 25 at the base of the chamber, from whence it passes through conduit 26 into brine refrigerating chamber 27 where the brine is cooled by means of a refrigerant passing through tubes not shown, and thence is passed into filter chamber 28, where brine is cleaned of impurities and drawn through pump 29 for delivery through conduits 30 to the discharge coil 23 carrying the nozzles 24. Although within the present illustration only one series of nozzles are shown above the conveyor belt to discharge spray downwardly at various angles, it is within the province of this invention to provide a further upwardly discharging spray between the parallel horizontal portions of the conveyor belt 20.

The frozen cherries are then deposited from conveyor 20 onto a conveyor 31 leading out of the freezing chamber or tunnel, where the frozen cherries are washed by a water spray 32 to remove the brine. From the washing conveyor the frozen cherries are delivered to inclined conveyor 33 leading to the hopper 34 of the pitting machine 35, where the washed frozen cherries or like fruit are pitted by an automatically operated device, to the plungers of which cherries are automatically individually fed, the pits dropping into container 36 and the pitted cherries being discharged into container 37. Sugar, either powdered or in syrup form, is discharged from container 38 into container 37, pre-cooled sugar syrup at a temperature of about 20° F. being preferred. The containers filled with the frozen, pitted and sugared cherries are then put into cold storage and held there at a temperature from 0° to 15° F. It is advisable that the cherries after leaving the freezing chamber 18 be acted upon to carry out the washing, pitting and sugaring steps in chambers at a temperature somewhat below 32° F., a preferable range being at about 20° F.

Although the illustration and description herein have related to cherries in particular, it is within the province of this invention to provide for the freezing and packing of any fruit, particularly those having pits, the essential purpose of this invention being, as has been hereinbefore stated, the application of atomized refrigerant directly upon the product passing through a tunnel or chamber within a very short period of time, and pitting the product after freezing.

It is obvious that various changes and modifications may be made to the details of construction without departing from the general spirit of the invention as set forth in the appended claims.

I claim:

1. A method of treating edible products having pits, comprising quick freezing the same, pitting the same while frozen, and packing the same with sugar syrup in containers for cold storage.

2. A method of treating pit containing food products, comprising quick freezing the same by spraying a refrigerant thereon, washing the frozen product to remove traces of salts incorporated in the refrigerating spray, and pitting the frozen product.

3. A method of treating pit containing food products, comprising quick freezing the same by spraying a refrigerant thereon, washing the frozen product to remove traces of salts incorporated in the refrigerant spray, pitting the frozen product, and packing the same for storage with sugar or the like.

4. A method of treating cherries, comprising washing and grading the same, subjecting the same to a refrigerating spray at freezing temperatures of about 0° F., washing the same to remove excess refrigerant, pitting the frozen cherries, and packing the pitted cherries with pre-cooled sugar syrup.

5. A method of treating cherries or like fruits, comprising refrigerating cherries by quick freezing the same and pitting the same after refrigeration.

6. A method of treating pit containing food products comprising refrigerating a pit containing product by quick freezing the same and subsequently pitting the quick frozen product.

WLADIMIR M. ZAROTSCHENZEFF.